May 13, 1952     A. E. EGBERT     2,596,329
ACCESSORY HEATER DEVICE USABLE ON COOKING STOVE BURNER
Filed Nov. 10, 1947
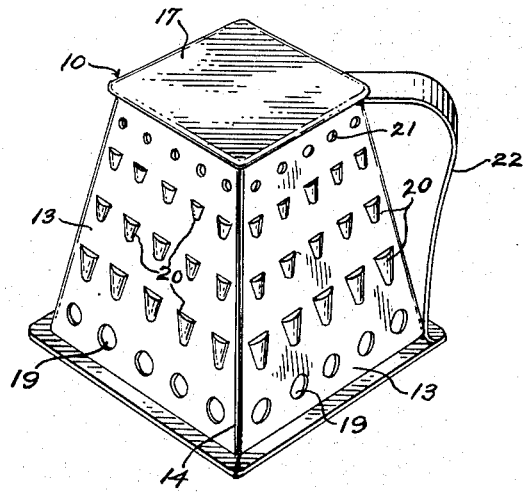
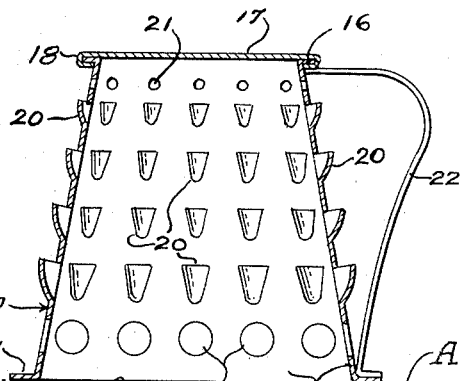
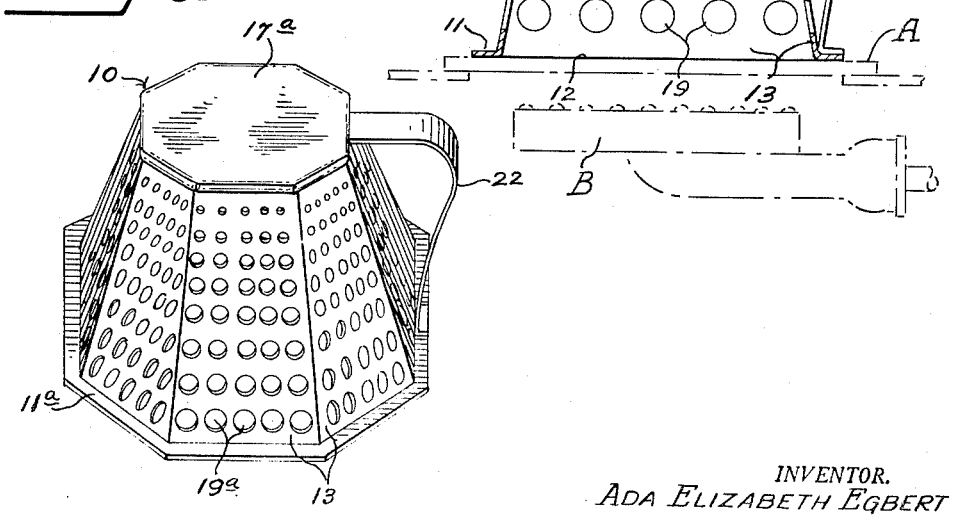
INVENTOR.
ADA ELIZABETH EGBERT
BY
ATTORNEY.

Patented May 13, 1952

2,596,329

UNITED STATES PATENT OFFICE 2,596,329

ACCESSORY HEATER DEVICE USABLE ON COOKING STOVE BURNER

Ada Elizabeth Egbert, Los Angeles, Calif.

Application November 10, 1947, Serial No. 785,115

2 Claims. (Cl. 126—248)

This invention relates to heaters, and more particularly relates to heaters of an auxiliary or accessory type which may be mounted on the usual grill overlying a stove burner, such for instance, as is conventional in cooking stoves employing gas, oil or electricity for fuel or thermal units.

Among the objects of the invention are to provide a heater device which may be selectively mounted over the grill of a burner of a cook stove as an auxiliary accessory heater.

A further object is to provide an accessory heater in which means are provided for convection currents of heated air.

A further object is to provide an accessory heater for dispelling a heated air current in gradations from bottom to top.

Another object is to provide in such a heater for directing a column of heated air upwardly and for radiation of heat laterally.

A still further object is to provide in an accessory heater a warming plate at a flat top which is relatively smaller in area than a flat open base.

An additional purpose of the invention is to provide an accessory heater which may be readily and conveniently placed upon and removed from a suitable burner, and which is economical in manufacture and operation, simple in structure and convenient in use, or storage when not in use.

In the accompanying drawing:

Fig. 1 is a perspective view of one form of embodiment of the invention;

Fig. 2 is a central lateral transverse section of the device of Fig. 1 and showing diagrammatically in broken lines a cook stove grill and burner Fig. 3 is a perspective view of a modified form of the invention.

With the foregoing and other objects in view, all of which will be apparent from this specification, one form which the invention may take is described herein and illustrated in the accompanying drawing which is made a part hereof, it being understood that changes may be made in materials, size, shape, and minor details without departing from the spirit of the invention which is defined in the appended claims.

Referring to the drawing in which like reference characters indicate corresponding parts in the several views, 10 indicates generally the heater body, made of sheet metal of suitable gauge, which has a base flange 11 preferably substantially flat, rectangular and square in plan though other shapes may be employed for the base such as octagonal, circular, pentagonal, etc. The base is of any suitable width to furnish convenient width of base support, and is open at its central portion as at 12.

Extending upwardly from the base flange 11, and conforming at the lower end to the shape of the opening 12, are side walls 13 inclined inwardly from the base toward the top, providing a hollow or shell pyramid frustum, the sidewalls of which are preferably continuous sheet material joined at a corner in an overlap seam 14. The upper ends of the side walls are flanged outwardly as at 16 whereby a closure plate 17 may, by metal seaming or spotwelding, be fixedly connected to the upper ends of the side walls. The top 17 is of greater dimensions than the open top of the hollow frustum so that the perimeter edge portion of the top overhangs the upper portion of the side walls as an outwardly extended flange 18.

The side walls 13 are provided with orifices between the base and top cover plate to permit currents of heated air generated within the hollow body to be dispelled. These orifices may be circular or of other geometric shape. They are, however preferably arranged in relatively spaced rows around the sidewalls and are of greater area adjacent the bottom of the side walls and decrease in area of opening progressively in rows toward the top.

Referring to Fig. 1, there are provided circular openings 19 in the plane of the material of the sidewalls at the lower row of openings adjacent the base. These openings are relatively large as compared with the openings in the more elevated rows. In the next above several rows of openings, the side wall is integrally cupped outwardly by horizontal incision of the side wall and upsetting of the metal whereby the openings in the side wall are wider at the top and tapered towards the base and the upset portion of the side wall overlies the opening substantially as vertical half segments of an inverted cone open at its upwardly positioned base. These conical formations 20 and the openings thereof preferably progressively decrease in size in the rows from the lower row to the upper row, since this permits substantially an equal number of openings in each row, though the width of wall may become narrower due to the upward incline, and it is further preferred that the area of the openings be diminished progressively in the rows from bottom to top. At the extreme upper portion of the sidewalls there is provided a row of circular openings 21 of relatively small area just below the overhang or flange 18.

A suitable manipulating handle 22 is mounted at one of the angular junctions of the side walls. This handle may be of any suitable non-inflammable material. Preferably its ends are respectively rivetted or spot welded to the overhanging flange of the top plate 17 and to the base flange 11. The upper end of the handle extends outwardly in substantially the same plane as the top plate and should not extend above the plane of the top plate.

In the modification of Fig. 3, the base 11a and top 17a are shown as octagonal, and the orifices in the side walls 19a are uniformly circular diminishing in orifice area in rows progressively from bottom to top.

In operation, and with reference to the accomplishment of the objects of the invention, it is to be noted that the heater is an accessory which may at any selective time be mounted over a grill A of a standard burner B of a gas or electric stove, used when desired and removed at will. Because of its compactness it is easily stored in a small space. Its flat top being substantially spaced from direct contact with a flame or electric coil, provides a warming plate without great danger of burning cooking utensil or its contents, the handle member extending outwardly substantially in the same plane as the top plate and not extending above the plane of the top plate facilitates the placing of utensils of large base area on the top plate.

In use as a heater, air of the room passes through the large orifices 19, 19a at the base, passes over the heating element of the stove burner, and rising and also expanding from becoming heated, passes out of the orifices in the more elevated rows of orifices. Particularly in Fig. 1, the dispelled heated air is directed upwardly in a column by the conical taper of the upwardly opened cupped orifices 20. The discharge orifices in the lower portion of the side wall being closer to the stove burner dispel the heated air of highest temperature and completely combusted gases whereas the openings of smaller area more nearly adjacent the top plate provide more restricted openings which, while permitting heated air to pass freely, restrict the flow more than the larger openings so that by partially retarding the air flow from the upper openings the air is maintained subject to heating for a slightly longer time and thus also becomes intensely heated, as well as maintaining any unburned gases in retarded flow until they are consumed.

The upper row of small circular openings 21 immediately below the overhanding top flange 18 permit an outflow of heated air or gases from the interior of the heater, but it is not necessary that they be directed upwardly, since the flange directs the heated air from those openings outwardly.

Obviously the area of the side walls and top not occupied by the orifices, also serve to radiate heat.

As a further example of use it may be stated that the heater of this invention is especially advantageous in heating a kitchen instead of adopting the customary practice of lighting an oven for that purpose and thereby eliminates the inconvenience of having the oven door maintained open into the room, and in that connection it also has an added factor of safety because the heater is always subject to view and thus visibly discloses whether a flame is burning thereunder.

Since the heater is in view while in use, it is desirable that it be maintained nicely presentable in appearance, and it is, therefore preferred that it be constructed of non-rusting metal, such, for example, as stainless steel.

While the invention is not limited to any particular size, a suitable, attractive and desirable size would be approximately a base of six inch diameter, a top of approximately four inch diameter, and a height of approximately five inches.

It is also to be understood that it is not intended to limit the invention to orifices or openings in the sidewalls, which are stamped out, as by die stamping, or to the openings of inverted conical formations 20, since it is contemplated that such orifices may also be formed by any other means, such as pushing a hole or opening through the metal.

Having described the invention, what is claimed as patentable is:

1. A device of the character described, comprising a hollow shell having a centrally open base at one end adapted for seating over a heating unit, side walls inclined upwardly and inwardly from the base, a top closure plate at the top end of the side walls and supported thereby, said side walls each having a plurality of rows of orifices therein, parallel to the base, the row of orifices next adjacent the base being in the plane of the side walls and the orifices thereabove being tapered downwardly and having an integral overlying wall portion upset outwardly from the side wall material and integral with the wall at the lower edge of the orifices, said orifices opening toward the top plate.

2. A device of the character described, comprising a hollow shell having a centrally open base at one end adapted for seating over a heating unit, side walls inclined upwardly and inwardly from the base, a top closure plate at the top end of the side walls and supported thereby, a handle member extending outwardly closely below the plane of the top plate and having no portions extending thereabove, said side walls having orifices therein intermediate the base and top plates graduated in area of openings from larger openings adjacent the base towards smaller openings adjacent the top, the orifices adjacent the base being in the plane of the side walls and the orifices thereabove being tapered downwardly and having an integral overlying conical wall portion upset outwardly from the side wall material and integral with the wall at the lower edge of the orifices, said orifices opening towards the top plate.

ADA ELIZABETH EGBERT.

REFERENCES CITED

The following references are of record in the file of this patent:

UNITED STATES PATENTS

| Number | Name | Date |
|---|---|---|
| 38,318 | McDowell | Apr. 28, 1863 |
| 492,431 | Rennyson | Feb. 28, 1893 |
| 554,529 | Murphy | Feb. 11, 1896 |
| 610,668 | Wilson | Sept. 18, 1898 |
| 878,028 | Wagner | Feb. 4, 1908 |
| 990,268 | Hohmann | Apr. 25, 1911 |
| 1,037,306 | Peterson | Sept. 3, 1912 |
| 1,062,304 | Steineke | May 20, 1913 |
| 1,164,066 | Burleson et al. | Dec. 14, 1915 |
| 1,171,372 | Whikehart et al. | Feb. 8, 1916 |
| 1,261,160 | Peirce | Apr. 2, 1918 |
| 1,366,886 | Otto | Jan. 25, 1921 |
| 1,423,651 | DeJaco | July 25, 1922 |
| 1,801,928 | Lange | Apr. 21, 1931 |

FOREIGN PATENTS

| Number | Country | Date |
|---|---|---|
| 4,545 | Great Britain | of 1906 |
| 33,893 | Netherlands | Oct. 15, 1934 |